(12) United States Patent
Audunson et al.

(10) Patent No.: US 8,409,334 B2
(45) Date of Patent: Apr. 2, 2013

(54) OXYGENATION OF WATER FOR A POPULATION OF FISH

(75) Inventors: Tore Audunson, Sandefjord (NO); Earl Meyer, Oklahoma City, OK (US); Geir O. Eriksen, Fredrikstad (NO)

(73) Assignee: Oxy Solutions AS, Oslo (NO)

( * ) Notice: Subject to any disclaimer, the term of this patent is extended or adjusted under 35 U.S.C. 154(b) by 0 days.

(21) Appl. No.: 13/429,988

(22) Filed: Mar. 26, 2012

(65) Prior Publication Data
US 2012/0234254 A1   Sep. 20, 2012

Related U.S. Application Data

(63) Continuation of application No. 12/639,796, filed on Dec. 16, 2009, now Pat. No. 8,142,550.

(60) Provisional application No. 61/122,943, filed on Dec. 16, 2008.

(51) Int. Cl.
*B01F 3/04* (2006.01)

(52) U.S. Cl. .................. 95/241; 43/57; 261/77

(58) Field of Classification Search ........ 43/57; 95/241, 95/258, 260; 261/77
See application file for complete search history.

(56) References Cited

U.S. PATENT DOCUMENTS

| | | | |
|---|---|---|---|
| 4,060,574 A | 11/1977 | Verner et al. | |
| 4,639,340 A | 1/1987 | Garrett | |
| 4,645,603 A | 2/1987 | Frankl | |
| 4,761,228 A | 8/1988 | Weisenbarger et al. | |
| 5,302,325 A | 4/1994 | Cheng | |
| 5,333,465 A | 8/1994 | McBride | |
| 5,616,250 A | 4/1997 | Johnson et al. | |
| 5,709,799 A | 1/1998 | Engelhard | |
| 5,728,287 A | 3/1998 | Hough et al. | |
| 5,766,490 A | 6/1998 | Taylor et al. | |
| 5,814,222 A | 9/1998 | Zelenak et al. | |
| 5,885,467 A | 3/1999 | Zelenak et al. | |
| 5,904,851 A | 5/1999 | Taylor et al. | |
| 5,925,292 A | 7/1999 | Ziesenis | |
| 6,120,008 A | 9/2000 | Littman et al. | |
| 6,250,609 B1 | 6/2001 | Cheng et al. | |
| 6,279,882 B1 | 8/2001 | Littman et al. | |
| 6,423,236 B1 | 7/2002 | Shiota et al. | |
| 6,780,331 B2 | 8/2004 | Galatro et al. | |
| 6,821,438 B2 | 11/2004 | Hadley et al. | |
| 6,824,695 B2 | 11/2004 | Tempest, Jr. | |
| 6,936,179 B2 | 8/2005 | DeWald | |
| 7,100,542 B2 | 9/2006 | Ehresman | |
| 7,168,414 B2 | 1/2007 | Harvey | |
| 7,631,615 B1 * | 12/2009 | Mast ..................... | 119/226 |
| 2007/0062160 A1 | 3/2007 | Stadlmayr et al. | |
| 2010/0270240 A1 * | 10/2010 | Hebert et al. ............ | 210/668 |
| 2010/0301498 A1 | 12/2010 | Matsumura et al. | |

* cited by examiner

*Primary Examiner* — Robert A Hopkins
(74) *Attorney, Agent, or Firm* — Hall Estill Attorneys at Law (57) ABSTRACT

Method and apparatus for producing an oxygenated fluid. In accordance with various embodiments, a vessel of water is provided for housing a population of fish. A stream of oxygenated water is generated to have a dissolved oxygen content of at least about 70 milligrams/liter (mg/l). The stream of oxygenated water is diluted with a second stream of water to provide an output stream with a dissolved oxygen content of from about 5 mg/l to about 14 mg/l. The output stream is injected into the vessel to maintain the population of fish.

17 Claims, 7 Drawing Sheets

FIG. 1

| Mineral | mg/L | Mineral | mg/L |
|---|---|---|---|
| Aluminum | 1420 | Mercury | <0.005 |
| Antimony | 0.138 | Molybdenum | 0.084 |
| Arsenic | <0.02 | Neodymium | 0.069 |
| Barium | 0.065 | Nickel | 10.6 |
| Beryllium | 0.038 | Niobium | 0.039 |
| Bismuth | 0.072 | Osmium | <0.01 |
| Boron | 3.27 | Palladium | 0.007 |
| Bromine | 8.39 | Phosphorus | 5.22 |
| Cadmium | 0.096 | Platinum | <0.005 |
| Calcium | 562 | Potassium | 28.6 |
| Carbon | 6190 | Preseodymium | 0.051 |
| Cerium | 0.096 | Rhenium | <0.005 |
| Cesium | 0.052 | Rhodium | <0.005 |
| Chloride | 197 | Rubidium | 0.396 |
| Chromium | 0.068 | Ruthenium | 0.045 |
| Cobalt | 1.97 | Samarium | 0.167 |
| Copper | 1.56 | Scandium | 0.085 |
| Dysprosium | 0.043 | Selenium | 0.047 |
| Erbium | 0.182 | Silicon | 43.8 |
| Europium | 0.396 | Silver | 0.031 |
| Fluoride | 7.29 | Sodium | 98.7 |
| Gadolinium | 0.196 | Strontium | 3.19 |
| Gallium | 0.082 | Sulfur | 5170 |
| Germanium | 0.046 | Tantalum | 0.062 |
| Gold | 0.011 | Terrulium | 0.025 |
| Hafnium | 0.033 | Terbium | 0.018 |
| Holmium | 0.065 | Thallium | 0.084 |
| Indium | 0.019 | Thorium | 0.027 |
| Iodine | 3.27 | Thulium | 0.059 |
| Iridium | <0.005 | Tin | 0.372 |
| Iron | 308 | Titanium | 0.068 |
| Lanthanum | 0.041 | Tungsten | 0.092 |
| Lead | 0.035 | Vanadium | 31.2 |
| Lithium | 0.586 | Ytterbium | 0.39 |
| Lutetium | 0.06 | Yrtrium | 2.88 |

OXYGENATION OF WATER FOR A POPULATION OF FISH

RELATED APPLICATIONS

This application is a continuation of U.S. patent application Ser. No. 12/639,796 filed Dec. 16, 2009, now U.S. Pat. No. 8,142,550 which claims priority to U.S. Provisional Application No. 61/122,943 filed Dec. 16, 2008 which are hereby incorporated by reference.

BACKGROUND

The present application is generally directed to improvements in the oxygenation of a fluid, such as but not necessarily limited to water. There continues to be widespread interest in the production of fluids with a dissolved oxygen content. One effectual method for producing an oxygen enriched fluid is discussed in U.S. Pat. No. 6,821,438 to Hadley et al., assigned to the assignee of the present application and incorporated herein by reference.

In the Hadley patent, a fluid such as water is subjected to a processing sequence whereby the fluid and an injected oxygen content are passed through a high speed venturi assembly and subjected to a strong magnetic field. The oxygen absorption rate and longevity of the dissolved oxygen using this process has been demonstrated to be superior to other prior art oxygenation approaches.

With the continued consumer demand for fluids with a dissolved oxygen content, including but not limited to beverages such as water, there nevertheless remains a continual need for improvements in the manner in which oxygen can be dissolved in and retained by a fluid. It is to these and other improvements that various embodiments of the present invention are generally directed.

SUMMARY

Various embodiments of the present invention are generally directed to a method and apparatus for oxygenation of a fluid.

In accordance with various embodiments, a vessel of water is provided for housing a population of fish. A stream of oxygenated water is generated to have a dissolved oxygen content of at least about 70 milligrams/liter (mg/l). The stream of oxygenated water is diluted with a second stream of water to provide an output stream with a dissolved oxygen content of from about 5 mg/l to about 14 mg/l. The output stream is injected into the vessel to maintain the population of fish.

These and other aspects of various embodiments of the present invention will become apparent in view of the following detailed discussion and the accompanying drawings.

DETAILED DESCRIPTION

Figure 1:
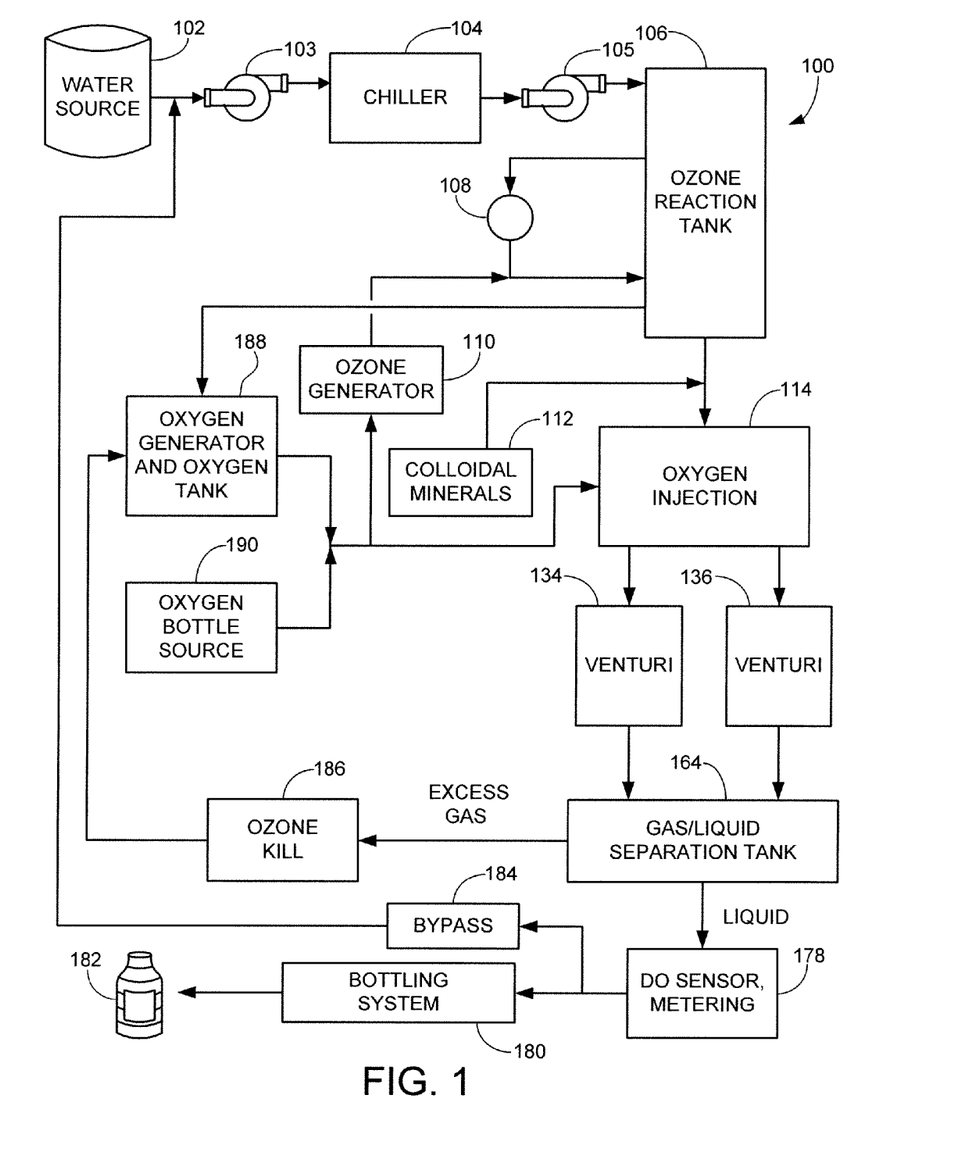
FIG. 1 provides a functional block representation of an oxygenation system constructed and operated in accordance with various embodiments of the present invention.

FIG. 1 shows a functional block representation of an oxygenation system 100 constructed and operated in accordance with various embodiments of the present invention. The system of FIG. 1 is characterized as a relatively high volume bottling system whereby large production runs of bottled water are generated. The water is bottled in conventional sealed plastic bottles or other suitable containers and the bottled water retains desired levels of dissolved oxygen.

While presently preferred embodiments are directed to the oxygenation of water, it will be appreciated that such is not limiting; for example, the system 100 of FIG. 1 could be readily adapted to oxygenate other types of fluids, such as but not limited to sports drinks, energy drinks, carbonated soft drinks, etc. The processed fluid may be prepared for human consumption or for a different purpose.

A water source 102 is initially provided to supply water for the system 100. In some embodiments the water supplied by the source 102 is subjected to reverse osmosis processing. This so-called "RO water" may have a total dissolved solids (TDS) content on the order of around 5-20 parts per million (ppm, or milligrams/liter, mg/l). Other treatments of the water can be carried out at this stage as well, including the application of ultraviolet (UV) light, filtering, etc. to reduce microbe levels or otherwise condition the water for processing.

The water from the source 102 can be alternatively subjected to a deionization process to produce so-called "DI water" in which the water has substantially no TDS. In still other embodiments, the water is supplied from a municipal water treatment system, a natural spring, a stream, or some other source with appropriate preconditioning as desired. In general, it is desirable to specify and control within reasonable limits the characteristics of the initial water so that the various settings of the system 100 can be tuned for this initial water.

The water from the source 102 may be pumped by a pump 103 or otherwise supplied at an appropriate pressure, such as on the order of 50 pounds per square inch (psi), and supplied to a chiller 104. The chiller reduces the temperature of the water to an appropriate temperature level. The chiller 104 may utilize a compressed refrigerant or other mechanism to chill the water.

Generally, it has been found that colder water can be more receptive to the receipt and retention of dissolved oxygen. In some embodiments, the water is chilled to a well-controlled temperature level such as on the order of around 10 to 13 degrees Celsius (50-55 degrees Fahrenheit). The water may undergo a temperature reduction of on the order of about 6-14 degrees Celsius (10-25 degrees Fahrenheit) during the chilling operation. The water may pass through a series of serpentine conduits to increase dwell time and heat removal from the water in a constant flow process, or the water may be accumulated in a reservoir vessel and drawn therefrom as needed downstream.

The chilled water may be forwarded by a constant pressure liquid pump 105 to an ozone reaction tank 106. Although the system 100 shows the use of pumps 103, 105, it is contemplated that the liquid may also be supplied in the system 100 from an elevated reservoir, domestic power supply, etc. at a suitable initial pressure so that no additional pressure is required to drive the fluid through the system.

The reaction tank 106 introduces an amount of ozone ($O_3$) into the water for anti-microbiological purposes. In some embodiments, a venturi 108 or other injection means can be used to introduce ozone from an ozone generator 110. Excess oxygen and ozone from the reaction tank 106 is released to the excess oxygen line to recover the remaining oxygen into an oxygen tank in a station 188.

The mixture of water and ozone passing out of the tank 106 is subjected to the introduction of colloidal minerals from a colloidal mineral source 112. As discussed more fully in the aforementioned Hadley patent, colloidal minerals provide electrostatic surface ion absorption characteristics that can enhance the ability of the water to absorb and retain injected oxygen. The amount and types of colloidal minerals added to the water will depend on the requirements of a given application.

Figure 2:
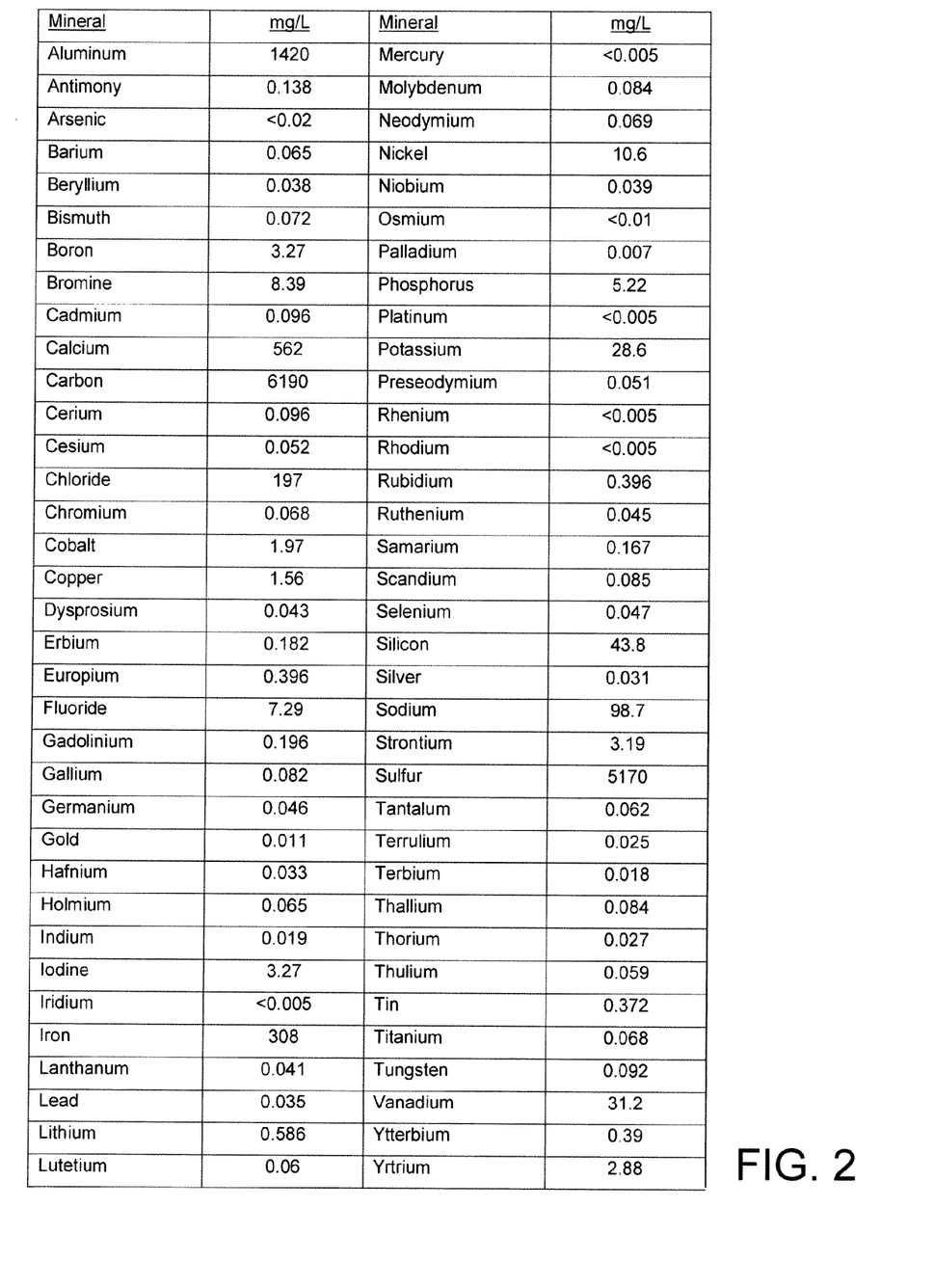
FIG. 2 lists an exemplary table of colloidal minerals suitable for use in the system of FIG. 1.

In some embodiments, the colloidal minerals are obtained from TRC Nutritional Laboratories, Inc., Tulsa, Okla., USA under the trademark TRC Minerals®. A suitable formulation of 77LPPM TRC Minerals is set forth by the table in FIG. 2. The formulation can be supplied in 55 gallon drums, has low microbiological counts, a pH in the range of from about 2.6-3.8, and a light yellow/tan color.

Figure 3:
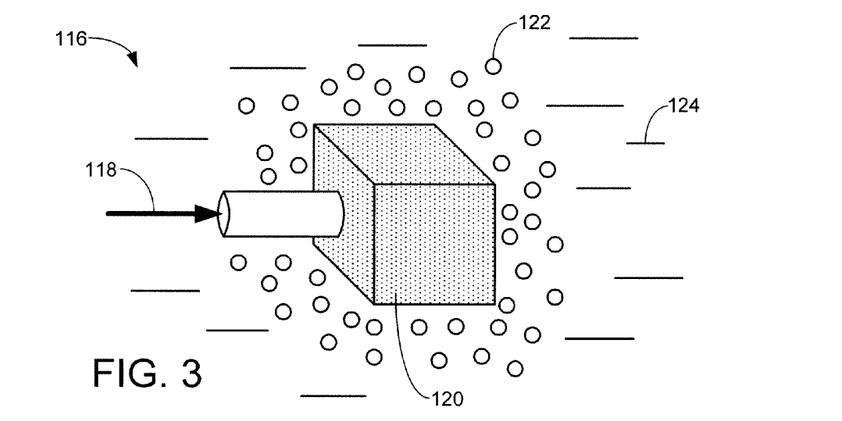
FIG. 3 shows a diffuser used in the system of FIG. 1.

The water and mineral mixture passes as a pressurized flow of fluid to an oxygen injection station 114. The station 114 operates to inject a flow of gaseous oxygen ($O_2$) into the water at a selected rate and concentration to form a fluid/oxygen mixture. A block diffuser 116 can be used as shown in FIG. 3, whereby inlet oxygen (represented by flow arrow 118) is forced via high pressure through a porous block 120 to provide a fine mesh of bubbles 122 into the surrounding water 124.

Figure 4:
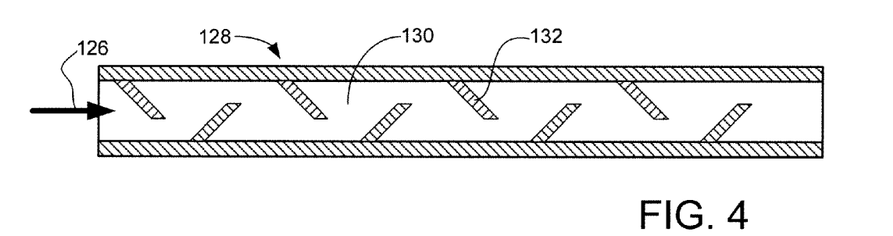
FIG. 4 illustrates a mixer of the system of FIG. 1.

As shown in FIG. 4, the resulting water/gas mixture 126 is directed through a passive mixer 128. This mixer includes a central conduit 130 with circularly extending blades 132 which induce controlled mixing and bubble reduction. This helps ensure distribution of the gaseous oxygen through the mixture.

A pair of venturi assemblies are next depicted at 134, 136 in FIG. 1. In some embodiments, the venturi assemblies 134, 136 are nominally identical and arranged in parallel. In other embodiments, venturi assemblies with different configurations, flow rates, etc. can be used. Separate valving and flow control features can be are provided so that either or both venturi assemblies can be operable at a time, depending on the overall throughput requirements of the system. The venturi assemblies 134, 136 can generally take a construction as set forth in the Hadley patent.

Figure 5A:
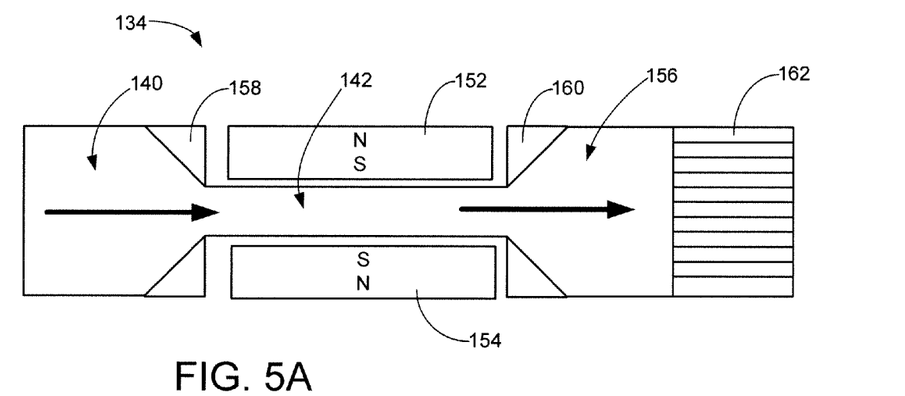
FIGS. 5A-5B provide respective side and end elevational representations of a venturi assembly of the system of FIG. 1.
Figures 5B, 6:
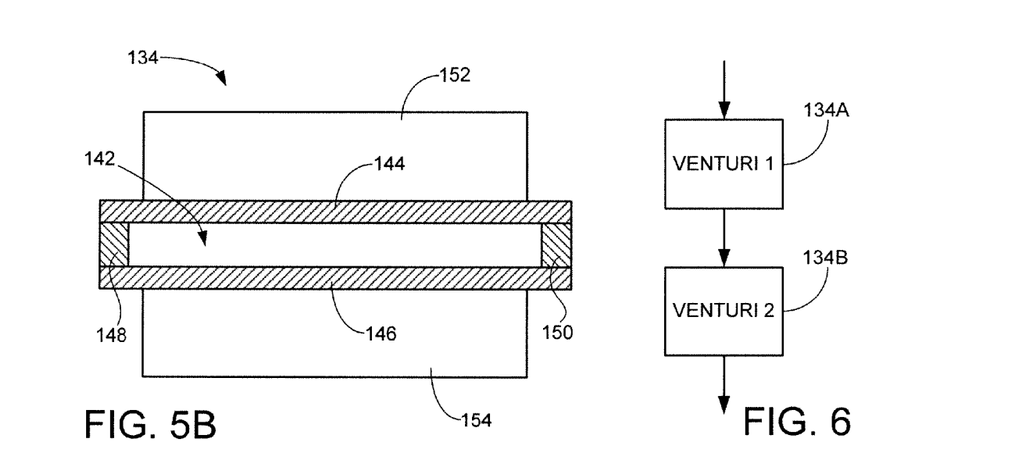
FIG. 6 shows a pair of venturi assemblies connected in series.

FIGS. 5A and 5B show the venturi assembly 134 in greater detail to include a central conduit 138 which passes from a first overall cross-sectional area zone 140 to a second, restricted cross-sectional area zone 142. In some embodiments, the first zone 140 can be a circular conduit (such as a PVC or metal pipe) and the second zone 142 can be an elliptical conduit such as shown in FIG. 5B. "Elliptical" refers to the cross-sectional shape having a greater width than length and does not necessarily require constant curvilinear surfaces. In some embodiments, parallel plates of plexi-glass or similar substrate material, such as denoted at 144, 146 in FIG. 4B, can be separated via spacers 148, 150 to form the elliptical second zone 142.

Ceramic block magnets 152, 154 are be placed adjacent the second zone 142 to form an adjacent magnetic assembly so that the fluid passes through a strong magnetic field as it flows through the venturi assembly 134. Other forms of magnetic assemblies, such as rare earth magnets, electromagnets, can alternatively be used as desired. After being subjected to the magnetic field, the fluid exits the second zone 142 and enters a third zone 156. In some embodiments, the third zone 156 is the same diameter and cross-sectional shape as the first zone 140. As shown in FIG. 5A, flow control wedges 158, 160 can be inserted into the respective conduits of the first and third zones 140, 156 to reduce turbulence. A downstream laminar flow grid 162 can further be provided to induce downstream laminar flow of the fluid.

While each of the individual parallel paths in FIG. 1 shows a single venturi assembly 134, 136, in further embodiments multiple venturi assemblies can be arranged in series, such as for the venturi assemblies 134A and 134B in FIG. 6. The use of multiple venturi assemblies as in FIG. 6 increases the dwell time that the fluid spends passing through the magnetic fields. Other arrangements can readily be used as desired, including venturi assemblies of different geometric configuration, venturi assemblies with different strengths and/or configurations of magnetic fields, etc. While in some embodiments the fluid passing through the venturi encounters magnetic flux oriented perpendicular to the direction of fluid flow, other orientations can be used based on empirical analysis.

The venturi assemblies operate as linear flow accelerators to accelerate the flow of the water/gas mixture to supersonic speeds. The speed of sound in the two-phase mixture of liquid and oxygen bubbles is on the order of around 15 meters per second (50 feet/sec), although this will vary depending on the concentrations of liquid and oxygen in the mixture. By comparison, the speed of sound in air is around 330 meters/sec (1,100 feet/sec) and the speed of sound in water is about 1,500 meters/sec (5,000 feet/sec).

The mixture is abruptly decelerated at the exit of each venturi assembly to return to subsonic speeds. The supersonic flow decelerates to subsonic flow across a thin region referred to as a shock wave. The shock wave breaks up the oxygen bubbles into microscopic size to promote mixing of the liquid and gas. Thus, subjecting the flow to two or more venturi assemblies in series as shown in FIG. 6 can serve to apply successive supersonic-subsonic pulses to the flow, further enhancing oxygen retention.

Figure 7:
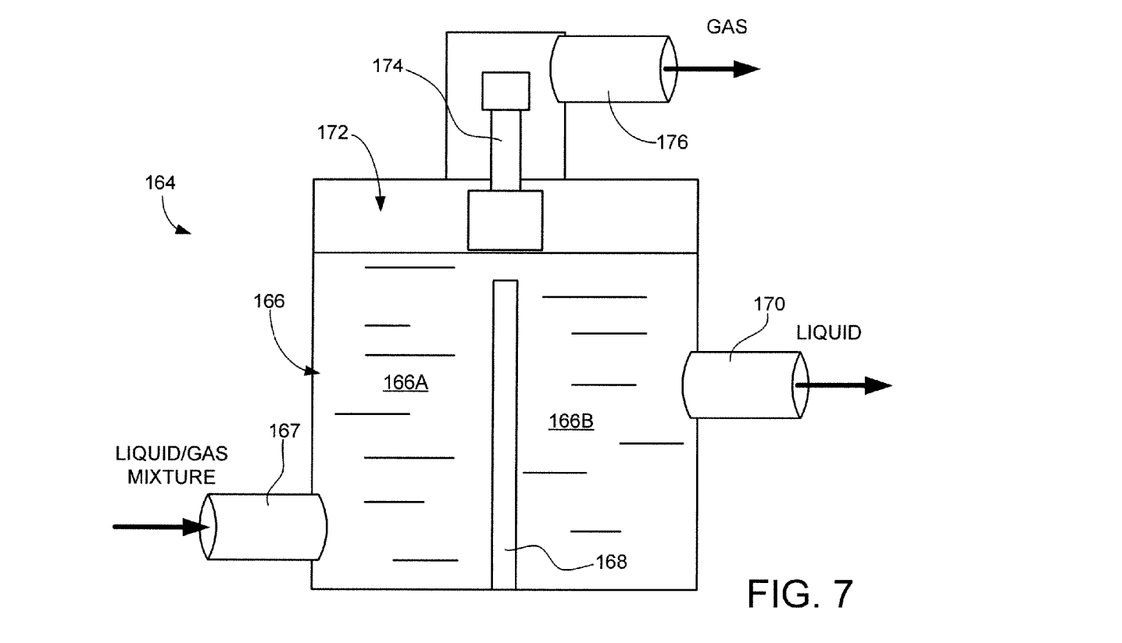
FIG. 7 shows a elevational representation of a gas/liquid separator of the system of FIG. 1.

Continuing with FIG. 1, once the fluid has passed through the venturi assemblies 134, 136, the fluid encounters a gas/liquid separation tank 164. The tank 164 can take a configuration as generally shown in FIG. 7 and includes a main chamber 166 into which the input fluid mixture is introduced via an inlet port 167 on one side of a middle partition barrier 168. The barrier, or baffle 168 divides the chamber into two halves, 166A and 166B. The input fluid fills the first half of the chamber 166A, after which point the input fluid spills over the baffle 168 and into the second half of the chamber 166B and to outlet port 170.

This provides a controlled gaseous space 172 above the liquid as well as an aeration action via the spillway of the middle partition barrier, depending on the relative levels of fluid on each side of the middle partition. A float valve assembly 174 is vertically actuated in relation to the fluid/gas level in the chamber 166. As the assembly 174 sinks, fluidic communication is established with a second outlet port 176. Thus, a liquid portion of the inlet fluid (with substantially dissolved oxygen) passes out of the first port 170 and the excess, non-dissolved gas passes out of the second port 176 for recovery and downstream reintroduction into the oxygenation process.

Continuing with the flow of FIG. 1, the liquid passing out of the first port 170 is subjected to a sensing stage 178 which can include a variety of sensors and monitors including a sensor to detect the amount of dissolved oxygen (DO) in the water. A mass flow meter may be used to sense flow rates. In some embodiments, the sensing can be carried out optically, electrically, etc. The sensing modules should be capable of operating at the requisite pressures of the pressurized flow. Other monitoring data can be captured at this stage, as well as at other appropriate locations along the process.

The liquid proceeds to a bottling system 180 which places appropriate amounts of the oxygenated water into bottles such as depicted at 182. The liquid passes a discharge control valve before being directed to the end application, e.g., the bottling system 180. An exemplary discharge pressure may be around 30 psi prior to the discharge control valve. A bypass path 184 allows excess oxygenated water to be returned to a suitable previous location in the process flow.

The excess gas from port 176 (FIG. 7) flows in FIG. 1 to an ozone kill station 186 which operates to destroy any ozone content in said gas, and to recover the remaining oxygen into an oxygen tank or other reservoir in the station 188, which supplies the input oxygen to the injection station 114. The station 188 can be used to produce oxygen from compressed air at hospital quality such as with a purity level of on the order of about 90% to 93%. An oxygen bottle source 190 can be used to supply the requisite oxygen from tanks or other pressurized vessels.

The system 100 of FIG. 1 has been found to advantageously provide dissolved oxygen levels on the order of upwards of around 70 ppm (70 mg/l) or more. The dissolved oxygen shows substantially improved levels of persistence; that is, the ability of the water to retain significant levels of the dissolved oxygen for extended periods of time, such as over a number of months. As discussed below, empirical testing showed dissolved levels well in excess of 40 ppm for bottled water with a shelf life in excess of three months.

Figure 8:
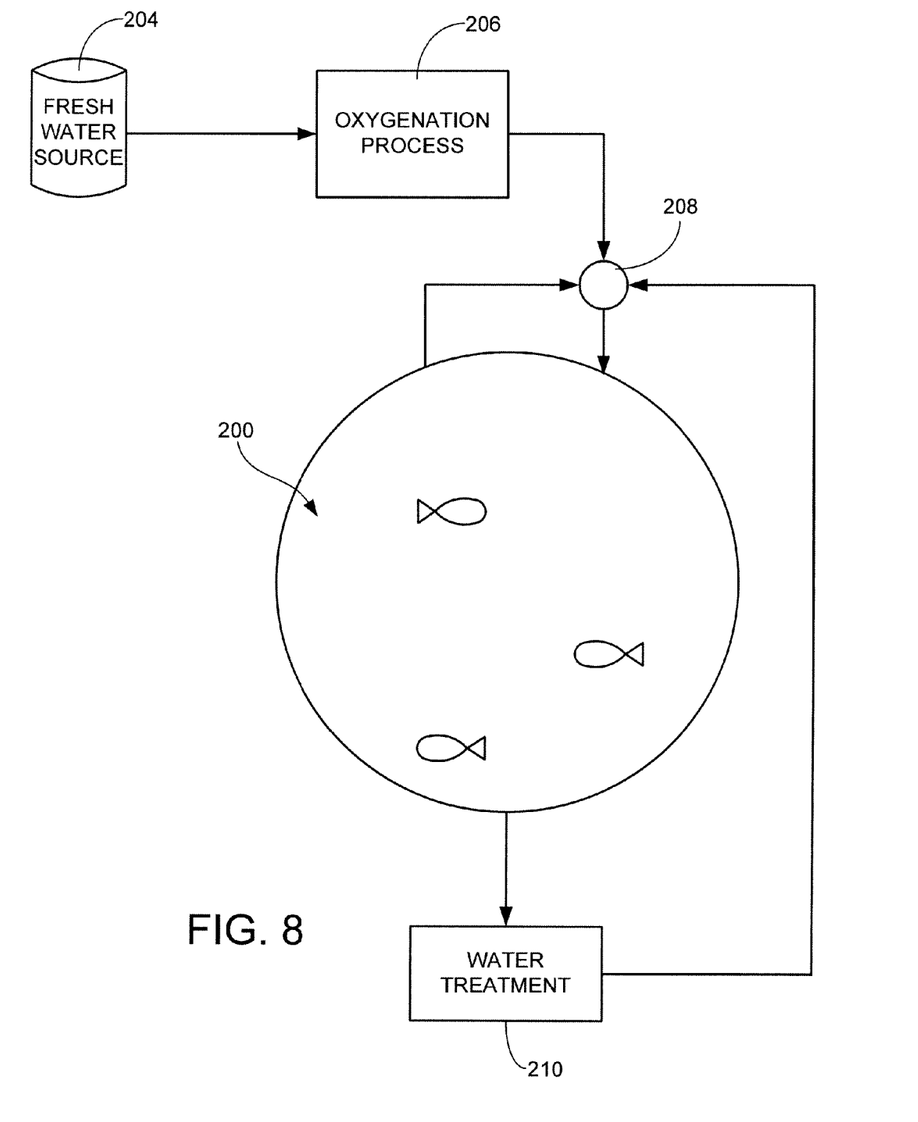
FIG. 8 shows a functional block representation of another embodiment of the present invention in which an oxygenation system similar to that set forth in FIG. 1 is used to provide oxygenated inlet water to a fish tank in a commercial fishery environment.

FIG. 8 shows an alternative embodiment to that of FIGS. 1-7, and can incorporate several of the components set forth therein. In FIG. 8, the oxygenated water is not provided as a beverage for human consumption, but rather for use by fish 202 (e.g., salmon, etc.) in the environment of a fish tank 200 in a commercial fishery environment.

As shown in FIG. 8, fresh water is supplied by an initial source 204, such as the various sources listed above in FIG. 1. This fresh input water is subjected to an oxygenation process block 206 which can incorporate the various steps shown in FIG. 1 (except for the bottling step and any other appropriate steps) to provide a stream of oxygenated water. Such water may have an initial concentration of dissolved oxygen on the order of about 70 mg/l, or some other value. Depending on the application, this concentration may be deemed too high for the health of the fish 202. Accordingly, the oxygenated water output from the block 206 can be diluted down to a more suitable level such as on the order of about 5-14 mg/l, as shown by dilution path 208.

Because the tank water will accumulate waste components, a portion of the tank water can be output and provided to a water treatment block 210, which can carry out suitable treatment of the water including filtering, settling (including a septic system, etc.), antibacterial treatment, de-nitrification, $CO_2$ removal, etc. The water treatment of block 210 could represent an inline treatment process, a local private treatment system, etc. The treated water or some component thereof can thereafter be incorporated into the dilution path 208. In this way, the amount of fresh water needed to sustain a population of fish 202 in the tank 200 can be significantly reduced over prior art systems.

Figure 9:
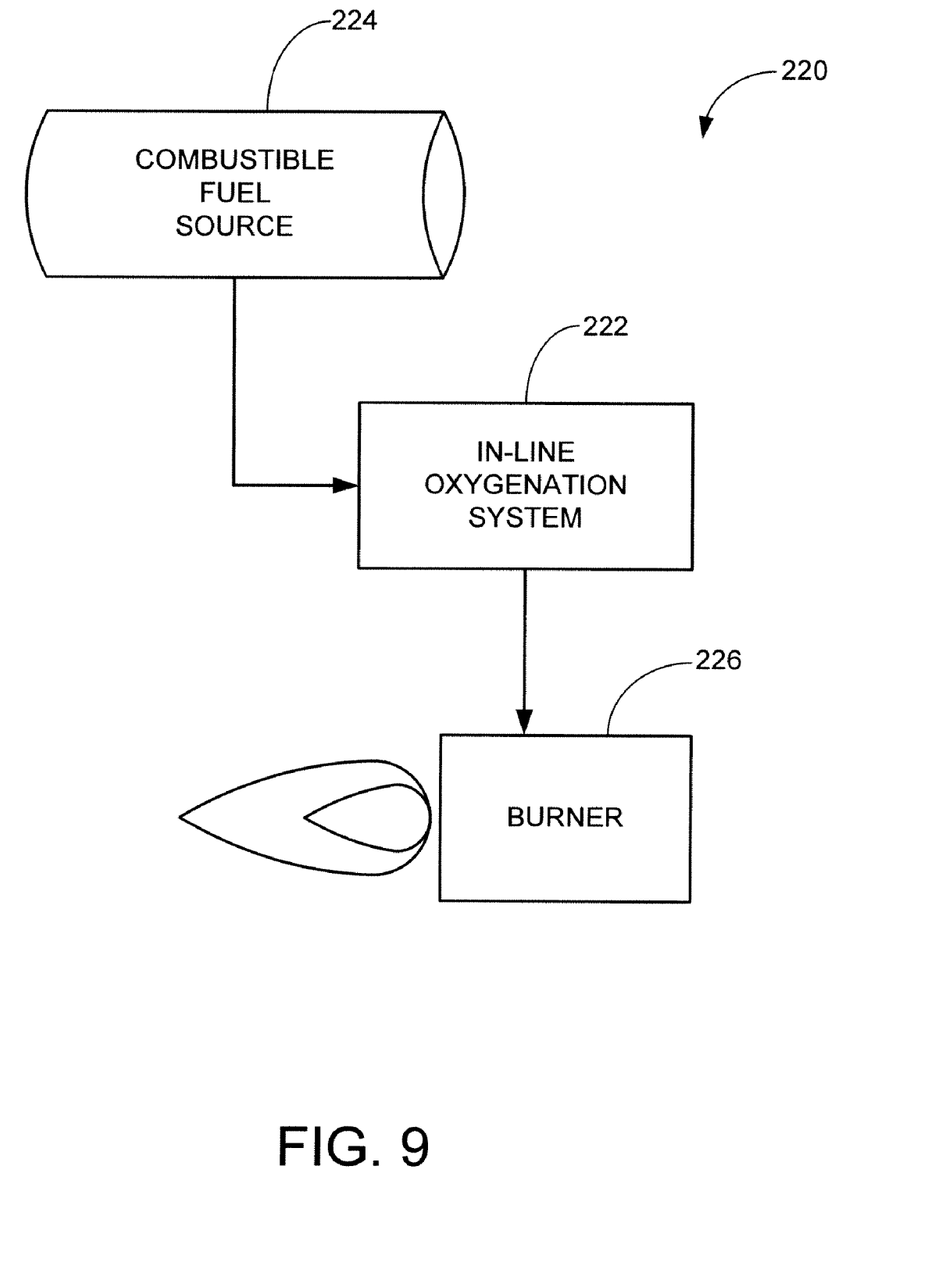
FIG. 9 shows a functional block representation of yet another embodiment of the present invention in which an oxygenation system similar to that set forth in FIG. 1 is used to provide oxygenated inlet fuel to a burner in an industrial environment.

FIG. 9 shows another embodiment for an oxygenation system 220 in which an oxygenation process 222, somewhat similar to that of FIG. 1, is used to add a dissolved oxygen component to a combustible (such as a hydrocarbon) fuel from a source 224. The fuel could be a heavy oil, such as diesel, a more volatile liquid fuel such as gasoline. Some or many of the steps carried out in FIG. 1 could be used by the process step 222 to inject a desired amount of dissolved oxygen into the fuel, after which the fuel and oxygen mixture is subjected to a burner 226 or some other process (such as an internal combustion engine, etc.).

EXAMPLE

A full scale (30 gallons per minute maximum) system conforming to that shown in FIG. 1 was built for the oxygenation of spring water. The spring water was subjected to an RO process and filtered to 5 microns ($5 \times 10^{-6}$ meter) so as to have the following nominal characteristics (all values are approximate):

Total dissolved solids (TDS)=10 to 20 parts per million;
pH=6.1;
Initial dissolved oxygen levels=7.2 milligrams per liter; and
Temperature=14° C. (57° F.).

The chiller 104 reduced the temperature of the spring water to 10° C. (50° F.). The constant pressure liquid pump 105 supplied the spring water to the system at 292 kilopascal (42.4 psi) at a flow rate of 30 liters per minute (7.9 gallons per minute).

The piping for the piping network between the pump 105 and discharge to the bottling system 180 had a nominal diameter of 3.8 cm (1.5 inches). The ozone generator 110 supplied ozone via the venturi 108 to the ozone reaction tank 106 with a volume of 57 liters (15.1 gallons) and a maximum flow capacity of 150 liters per minute (39.6 gallons per minute). Following the ozone reaction tank 106 a positive displacement fluid metering pump 112 injects colloidal minerals into the flow via a diffuser. The colloidal minerals used were supplied by TRC Nutritional Laboratories as previously discussed in FIG. 2.

The rate of colloidal minerals injected was regulated to give a TDS in the produced water between 30 and 50 ppm. The water and mineral mixture then passed to the oxygen injection station 114 where oxygen from the station 188 or the oxygen bottle source 190, or in combination, was injected via the block diffuser 116 at a pressure of about 64 kilopascals (9.3 psi) greater than the water pressure.

The resulting water/gas mixture then flowed through the passive mixer 128 (FIG. 3) before entering the venturi assembly 134 where the second zone 142 was formed by parallel plates of plexi-glass 144, 146 separated approximately 1 mm (0.04 in.) to 2 mm (0.08 in.) and with a length of approximately 150 mm (5.9 in.) to 250 mm (9.8 in.) and a width of approximately 80 mm (3.1 in.). While passing through the second zone 142, the flow was subjected to a strong magnetic field produced by the two ceramic block magnets 152, 154 (100 mm (3.9 in.)×50 mm (2.0 in.)×25 mm (0.98 in.)). Downstream of the venturi assembly 134 the liquid/gas mixture passed through the laminar flow grid 162 consisting of a bundle of approximately 2 mm stainless steal tubing typically 300 to 400 mm long.

After passing through the laminar flow grid 162, the liquid/gas mixture flowed into the 150 liter (39.6 gallon) gas/liquid separation tank 164 where excess non-dissolved oxygen gas was released through the second outlet port 176. Downstream from the gas/liquid separation tank 164, the flow passed through sensors for temperature, pressure and flow rate before being released through a flow control valve to a bottling arrangement where 0.5 liter bottles (16.9 oz) were filled at ambient pressure.

An initial test was performed to obtain an "initial" oxygen concentration in the water at the time of bottling. These "initial" samples showed DO values in excess of 60 mg/l, which is an out of range value for the handheld DO meter, indicating a substantially 10× increase in the DO value for the initial samples compared to the DO value before the oxygenation of the spring water.

Figure 10:
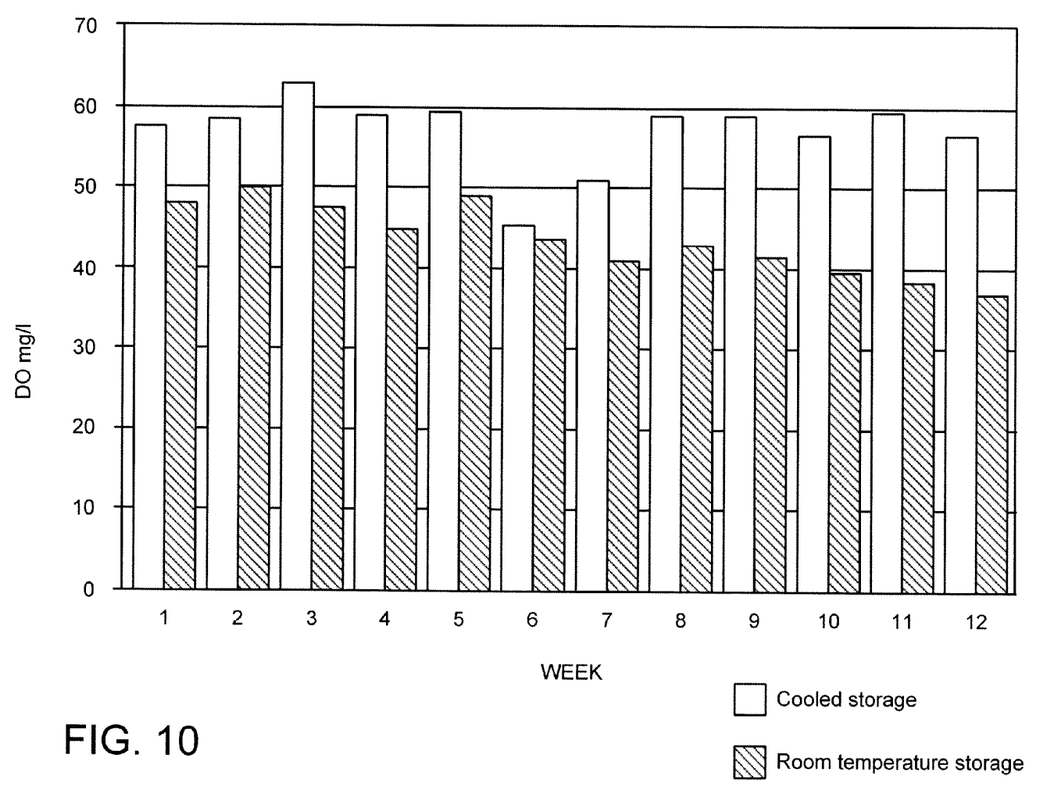
FIG. 10 is a chart showing oxygen concentration levels in oxygenated water prepared in accordance with various embodiments of the present invention.

Two boxes, each with 24 bottles of the bottled oxygenated water, were taken to Accurate Laboratories in Stillwater, Okla. for long term testing by an independent and certified laboratory. Representative results for these weekly tests are represented in FIG. 10. Half the bottles were kept at substantially room temperature (e.g., about 25 degrees Celsius) and the other half of the bottles were maintained in a refrigerated state (about 10 degrees Celsius). Two room-temperature bottles of water and two refrigerated bottles of water were opened each week over a 12 week period and the contents subjected to DO analysis.

All samples exhibited enhanced DO concentration levels. The bottled oxygenated water kept at room temperature for 12 weeks showed a slight downward trend in DO concentrations over time, although all DO levels were at or greater than 38 mg/l at the end of the 12 week testing period. On the other hand, the bottled oxygenated water maintained in a refrigerated state exhibited consistent DO concentrations on the order of between about 50 mg/l and 60 mg/l, with little or no decrease in DO concentrations over the testing duration.

While some decrease in DO concentrations may be expected to eventually occur for refrigerated water kept longer that 12 weeks, it appears from FIG. 10 that the decay rate may be relatively low. Thus, the results from FIG. 9 appear to suggest that DO concentrations above 35 mg/l (and probably well above 45 mg/l for refrigerated water) may be sustainable for several months for water subjected to oxygenation processing in accordance with the foregoing discussion. Despite the continued desire in the industry for long-shelf life oxygenated fluids, the inventors are unaware of any third party oxygenation system capable of exhibiting anything near this level of efficacy.

It will be appreciated that many other alternative embodiments and applications will readily occur to the skilled artisan in view of the foregoing discussion, so that the foregoing embodiments are merely illustrative of various embodiments, and are not limiting.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method, comprising steps of:
providing a vessel of water housing a population of fish;
generating a stream of oxygenated water having a dissolved oxygen content of at least about 70 milligrams/liter (mg/l) by injecting a flow of oxygen into a flow of water to provide a water/oxygen mixture and passing the water/oxygen mixture through a venturi assembly while subjecting the mixture to a magnetic field from an adjacent magnetic assembly;
diluting the stream of oxygenated water with a second stream of water to provide an output stream with a dissolved oxygen content of from about 5 mg/l to about 14 mg/l; and
injecting the output stream into the vessel to maintain said population of fish.

2. The method of claim 1, said injecting step further comprising a step of directing said water/oxygen mixture through a passive mixer for inducing controlled mixing and bubble reduction of said water/oxygen mixture.

3. The method of claim 1, further comprising a step of passing said water/oxygen mixture through a pair of venturi assemblies used in parallel so a first portion of said water/oxygen mixture passes through a first of said venturi assemblies and a second portion of said water/oxygen mixture passes through a second of said venturi assemblies.

4. The method of claim 1, further comprising a step of passing said water/oxygen mixture through multiple venturi assemblies arranged in series.

5. The method of claim 1, further comprising a step of injecting colloidal minerals into said flow of said water prior to said step of injecting said flow of oxygen into said water.

6. The method of claim 1, said establishing step further comprising a step of chilling said flow of said water to a selected temperature of about 10 to about 13 degrees Celsius prior to the injecting of the flow of oxygen step.

7. The method of claim 6, further comprising a step of subjecting said water to reverse osmosis prior to said step of chilling said flow of said water.

8. The method of claim 1, further comprising a step of flowing said water/oxygen mixture from said venturi assembly to a gas/liquid separation tank, wherein a liquid component is passed downstream with a selected dissolved oxygen content and a gas component is directed back for injection into said pressurized fluid flow.

9. The method of claim 8, further comprising a step of recovering said gas component and supplying gas component to an oxygen generator tank which supplies oxygen during said injecting step.

10. An apparatus comprising:
a vessel of water housing a population of fish;
an oxygenated water source in fluidic communication with said vessel, the oxygenated water source providing a stream of oxygenated water having a dissolved oxygen content of at least about 70 milligrams/liter (mg/l), the oxygenated water source comprising:
a first water source supplying water to form a pressurized flow stream of water;
an oxygen injection station in fluidic communication with said first water source, said oxygen injection station operating to inject gaseous oxygen into the pressurized flow stream of water to provide a water/oxygen mixture; and
a venturi assembly in fluidic communication with said oxygen injection station, wherein said water/oxygen mixture in said venturi assembly is subjected to a magnetic field by a magnetic assembly;

a second water source in fluidic communication with said oxygenated water source, the second water source providing a second stream of water to dilute the stream of oxygenated water to provide an output diluted stream of oxygenated water with a dissolved oxygen content of from about 5 mg/l to about 14 mg/l, in which the output diluted stream is injected into the vessel to maintain said population of fish.

11. The apparatus of claim 10, further comprising a passive mixer in fluidic communication with said oxygen injection station, said passive mixer induces controlled mixing and bubble reduction into said water/oxygen mixture.

12. The apparatus of claim 10, further comprising a pair of venturi assemblies used in parallel, a first portion of said water/oxygen mixture is passed through a first of said venturi assemblies and a second portion of said water/oxygen mixture is passed through a second of said venturi assemblies.

13. The apparatus of claim 10, further comprising a chiller in fluidic communication with said first water source, said chiller configured to reduce a temperature of the pressurized flow stream of water to an appropriate temperature level.

14. The apparatus of claim 13, wherein said water is subjected to reverse osmosis prior to being supplied to the chiller.

15. The apparatus of claim 13, further comprising an ozone reaction tank in fluidic communication with said chiller, said ozone reaction tank introduces an amount of ozone into said pressurized flow stream of water for antibiological purposes resulting in a liquid/ozone mixture.

16. The apparatus of claim 15, further comprising a source of colloidal minerals in fluidic communication with said ozone reaction tank, said source injecting colloidal minerals into said liquid/ozone mixture.

17. The apparatus of claim 10, further comprising a gas/liquid separation tank in fluidic communication with said venturi assembly, wherein a water component of said water/oxygen mixture is passed downstream with a selected dissolved oxygen content and a gas component of said water/oxygen mixture is directed back for injection into said pressurized flow stream of water.

* * * * *

UNITED STATES PATENT AND TRADEMARK OFFICE
CERTIFICATE OF CORRECTION

| | |
|---|---|
| PATENT NO. | : 8,409,334 B2 |
| APPLICATION NO. | : 13/429988 |
| DATED | : April 2, 2013 |
| INVENTOR(S) | : Tore Audunson, Earl Meyer and Geir O. Eriksen |

It is certified that error appears in the above-identified patent and that said Letters Patent is hereby corrected as shown below:

In the Claims:

In Col. 8, line 36
delete "step"

Signed and Sealed this
Tenth Day of September, 2013

Teresa Stanek Rea
*Acting Director of the United States Patent and Trademark Office*